INVENTORS
Norito Iwao
Koichiro Naito
Tadashi Kawaguchi
Minoru Maeda
Toshihito Morita INVENTOR
Norito Iwao
Koichiro Naito
Tadashi Kawaguchi
Minoru Maeda
Toshihito Morita

United States Patent Office 3,681,052
Patented Aug. 1, 1972

3,681,052
METHOD FOR CONTROLLING THE TREATMENT OF EXHAUST GASES IN OXYGEN TOP-BLOWING CONVERTER
Norito Iwao, Koichiro Naito, Tadashi Kawaguchi, Minoru Maeda, and Toshihito Morita, Kitakyushu, Japan, assignors to Nippon Steel Corporation, Tokyo, Japan
Filed Apr. 21, 1969, Ser. No. 817,902
Claims priority, application Japan, Apr. 22, 1968, 43/26,960
Int. Cl. C21c 5/32
U.S. Cl. 75—60                                      1 Claim

ABSTRACT OF THE DISCLOSURE

A method for controlling the treatment of exhaust gases produced in an oxygen top-blowing converter. The exhaust gases are collected from the converter in a gas collection apparatus including a gas flow volume adjusting means and a skirt movable close to the top of the converter while leaving a space between the skirt and the converter due to the buildup of a slag and the like. The composition of the collected gases flowing through the collection apparatus is continuously analyzed and compared with a predetermined optimum composition. The gas flow volume adjusting means is then adjusted to vary the volume of gas flow to draw in more or less air through the space between the skirt and the converter to change the gas composition so that it coincides with the predetermined optimum composition. The carbon content of the melt can also be determined by additionally determining the volume of the $CO+CO_2$ in the exhaust gases and calculating therefrom the rate of decarburization of the steel, and comparing the rate of decarburization near the end of the blowing with data from previous heats to determine the carbon content of the melt.

---

This invention is a method of adjusting the volume of air coming from outside an oxygen top-blowing converter into an exhaust gas produced in the converter so as to increase the CO content in the exhaust gas and to utilize said exhaust gas for controlling a steel producing operation, particularly the value of carbon in a steel bath.

It is already known to recover a CO-containing exhaust gas produced in an oxygen top-blowing converter and utilize it as a fuel or for other uses. It is also already known to utilize this exhaust gas a source of information for controlling a steel producing operation, particularly the value of carbon in a steel bath.

That is to say, in a known conventional apparatus for recovering an exhaust gas from an oxygen top-blowing converter, in order to maintain the quality of the recovered gas, the pressure in the converter is controlled so that the dilution of the gas with air coming in around the converter mouth can be prevented. As well known, this is an apparatus wherein a hood and movable skirt are provided between a converter mouth and a gas conduit pipe and an exhaust gas flow volume controlling damper is provided in the gas conduit pipe so that the pressure in the hood can be detected and the position of said damper can be adjusted to adjust the pressure. In such method, the skirt intercepting the air coming in past the converter mouth must be perfectly closed. This is to say, in order to attain the desired object, the contact between converter mouth and the skirt must be air-tight. However, in fact, slag or metal material is deposited on the converter mouth due to slopping during the blowing and, in most cases, it is impossible to perfectly close the skirt. Therefore, the converter pressure control in the true sense of the words is not performed.

This shall be explained with reference to FIGS. 1 and 2. Where the converter mouth and skirt can be tightly sealed as in FIG. 1a, the gas flowing through the gas conduit pipe will be only a gas FB (see FIG. 2) produced by a decarburizing reaction carried out on the molten steel and oxygen in the converter and the interior of the converter can be controlled so that it is at a determined pressure. However, where any clearance exists between the converter mouth and skirt because of such things as the deposition of slag on the converter port as in the FIG. 1b, outside air will come into the converter through said clearance and, as a result, the gas flowing through the gas conduit pipe will have a volume equal to the gas FB produced the FIG. 1–I case plus the incoming air FA as in FIG. 2 and the exhaust gas will be at a certain pressure and will be diluted. Further, where the converter mouth and skirt are widely separated from each other as in the FIG. 1c, a large volume of air will come into the converter and the variation of the total volume of air with the lapse of time will be in the linear relation as is shown in III at FIG. 2. However, even in such case, the pressure in the interior of the converter will be controlled so as to be at some determined pressure. That is to say, as evident from these explanations, where it is difficult to perfectly close the skirt, the converter pressure control is carried out, as a practical matter, with state outside air being sucked-in, though ideal converter pressure control should be carried out when inflow of air is prevented. As a result, when the limit of the percentage of CO in the recovered exhaust gas is fixed, in case II and still more in case III the recovering time will be shorter than in case I, and moreover the total amount of the gas will increase. Consequently, the gas treating equipment will have to be made larger than is necessary.

What is more important is that, when the exhaust gas in this method is to be used as an information source for a steel producing operation or particularly for the control of the value of carbon as is shown, for example, in French Pat. No. 1,309,212, the variation of the percentage of $CO+CO_2$ the exhaust gas with the lapse of time can not be anticipated, therefore the composition and flow volume of the gas must be measured from moment to moment to calculate the decarburizing velocity therefrom. However, this method has an inherent lag time, due to the structure, which results in the following defect. That is to say, in the exhaust gas analysis meter system, there is a so-called flow meter lag time which is the sum of the lag time for the movement of the gas from the converter mouth to the gas analysis meter and the time required for analyzing the gas which has arrived at the analysis meter and converting it to an electric signal. This lag time is quantitatively more than 10 seconds in the analysis system and less than 0.5 second in the flow meter system. In the converter operation, the blowing time is so short that such an analysis time lag has an influence on the decarburizing velocity information which is so great that it reduces the value of the information and the judgment of the steel bath carbon value based on it is incorrect and, as a result, there has been a fear that proper and definite operation cannot be carried out.

In view of such circumstances as are described above, the present invention seeks to control the volume of air sucked in by adjusting a gas flow volume adjusting apparatus so that the composition of the exhaust gas can be a predetermined composition and the defects of the known conventional method can be eliminated.

An object of the present invention is to recover an exhaust gas which is very high in CO concentration by limiting the volume of air mixing into the exhaust gas.

Another object of the present invention is to use the information of the exhaust gas flowing through the exhaust gas treating apparatus to control the content of carbon in the steel bath so that the converter operation will be proper and definite.

In order to attain such objects, the present invention provides a method for treating an exhaust gas produced in an oxygen top-blowing converter, comprising analyzing the composition of the gas is at every moment said gas flowing through an exhaust gas treating apparatus connected to a converter and adjusting a gas flow volume adjusting apparatus provided in the exhaust gas treating apparatus so that the analysis value will coincide with a predetermined variation of the exhaust gas composition with the lapse of time.

FIGS. 1a to 1c show various closed states of a converter mouth part and exhaust gas collecting device in an oxygen top-blowing converter. Therein the FIG. 1a shows a perfectly sealed state, the FIG. 1b shows a state in which some slag or metal material is deposited on the converter mouth part so as to produce a clearance and the FIG. 1c shows a state in which a large mass of the metal or the like is deposited at the converter mouth part that the mouth is substantially opened.

Figure 1A:
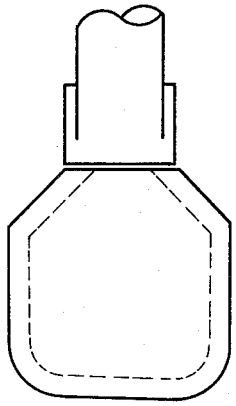
Figure 1B:
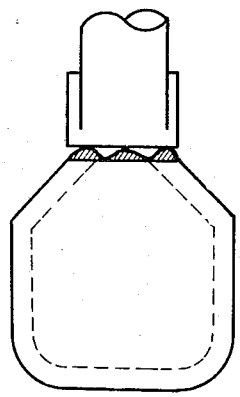
Figure 1C:
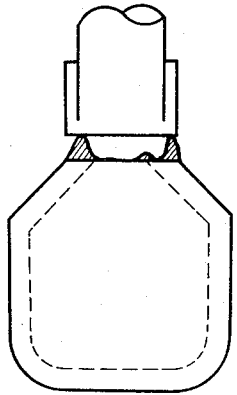
Figure 2:
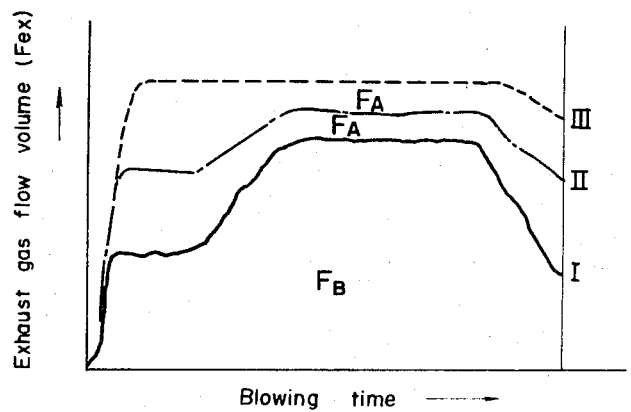
FIG. 2 is a graph showing relationships between the blowing time and the produced gas FB and incoming air FA in the states of the apparatus as shown in FIGS. 1a to 1c.
Figure 3:
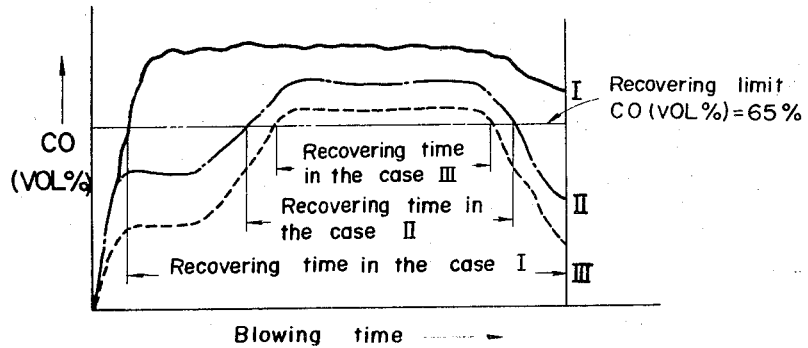
FIG. 3 is a graph showing relationships between the blowing time and the variation of the CO percentage ($n$) in the exhaust gas with the lapse of time in the states of the apparatus as shown in FIGS. 1a to 1c.
Figure 4:
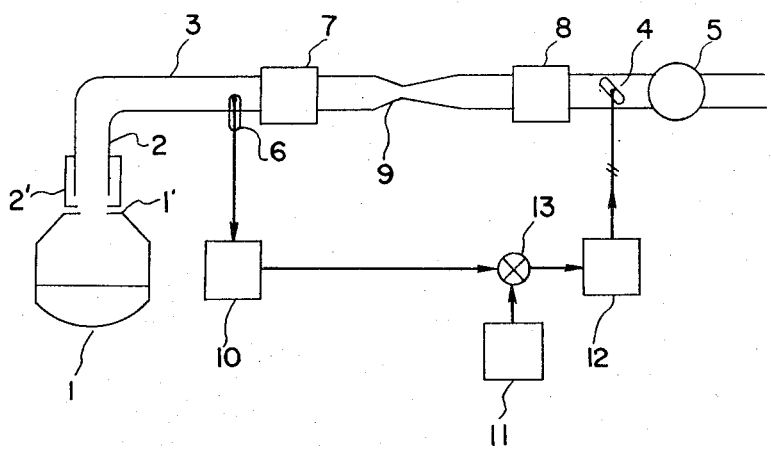
FIG. 4 is a schematic view of an exhaust gas collection system with a controlling apparatus embodying the present invention.

As described above, the present invention adjusts the gas flow volume adjusting apparatus provided in an exhaust gas treating apparatus so that the composition of the gas flowing through the exhaust gas treating apparatus which is analyzed from moment to moment can be adjusted so that said analysis value will coincide with a predetermined variation of the exhaust gas composition with the lapse of time. By such process, the volume of air mixing into the exhaust gas will be controlled and an exhaust gas which has a very high CO concentration can be recovered. Further, when said exhaust gas it to be used as an information source for the decarburizing reaction, it will be sufficient to measure the gas flow volume only, because for the gas composition itself the predetermined variations of the gas composition, particularly of the percentage of $CO+CO_2$ in percentage with the lapse of time can be applied as it is. Consequently, in this case the lag time will be very small.

In explaining the present invention, the variation of the composition of the exhaust gas with the lapse of time means the variation with the lapse of time of one or a combination of two or more of CO, $CO_2$, $O_2$ and $N_2$ contained in the exhaust gas, but when taking in consideration the use thereof for judging the error in the analysis meter or the carbon value in the steel, the variation of the percent of $CO+CO_2$ with the lapse of time is most practical. Therefore, the present invention shall be explained particularly with reference to the variation of the percent of $CO+CO_2$ with the lapse of time.

The present invention shall be concretely explained in the following with reference to the embodiment illustrated in the drawing. 1 is a converter in which oxygen is introduced into a steel bath through a lance. Above the converter is a hood 2 for collecting exhaust gas produced by blowing the oxygen. A vertically movable skirt 2' is arranged between a converter mouth 1' and said hood 2.

The hood 2 is connected to an exhaust gas conduit pipe 3 which in turn is connected with a suction fan 5 through a primary dust collector 7, Venturi tube 9 and secondary dust collector 8. In front of the suction fan 5 is positioned a damper 4 for controlling the volume of flow of the gas flowing through the exhaust gas conduit pipe 3. Said damper 4 may be a conventional flow volume controlling valve or any other type. A gas sampler 6 is provided in a proper place in the exhaust gas conduit pipe 3. The position of said gas sampler 6 should be in front of the above mentioned gas flow volume adjusting damper 4. However, if it is too far away from the converter mouth, the exhaust gas flowing time will increase the lag of the control and, if it is too near to the converter mouth part, the sampler 6 will be exposed to high temperature, whereby the analysis error will become large, partly also due to the state of the exhaust gas itself having a non-uniform composition due to the fact that it is still turbulent. Therefore, the position of the gas sampler should be selected with reference to the actual form of the apparatus. Said gas sampler 6 is connected directly with a gas analysis meter 10 so that the momentarily varying percentage of $CO+CO_2$ in the exhaust gas will be detected and communicated to a comparator 13.

In the comparator 13, there is determined the variation with the lapse of time of the percentage of $CO+CO_2$ in the exhaust gas as compared with a value determined in advance for the blowing conditions and supplied from a device 11 for setting the $CO+CO_2$ gas content.

This variation of the percentage of $CO+CO_2$ is determined from past data, particularly the blowing conditions, that is the amount of molten pig iron to be treated, the composition of the pig iron and the volume of oxygen. For example, in the initial period of the blowing, the volume of the gas is so small that surging of the suction fan is caused, even when the percentage of $CO+CO_2$ is increased.

Therefore, in this period, an attempt must be made to increase the volume of air sucked in by reducing the percentage of $CO+CO_2$ or the volume of the gas by separately introducing nitrogen or the like. Therefore, the percentage of $CO+CO_2$ in this period is determined as desired by taking into consideration the surging limit and the volume of the gas produced in response to the blowing conditions.

In the period of the maximum blowing, there is no longer such a fear and, from the viewpoint of the recovery of the gas, the higher the percentage of $CO+CO_2$, the better the effect. However, there is a steep pressure fluctuation (pulsating phenomenon) characteristic of the converter. Therefore, if the system is so designed as to greatly reduce the volume of blown air, not only will a part of the exhaust gas leak out of the converter and contaminate the atmosphere in the plant but also the gas flow volume meter will show a value different from the actual value, whereby so that no correct gas information can be obtained. Therefore, the variation of the percentage of $CO+CO_2$ with the lapse of time must be determined by taking these various conditions and circumstances into consideration.

Further, in the end period of the blowing, too, the variation of the percentage of $CO+CO_2$ with the lapse of time is determined in relation to the problem of the suction fan caused by the reduction of the volume of the exhaust gas and other requirements.

Now, the value of the percentage of $CO+CO_2$ determined by such blowing conditions set in the device 11 is supplied to the comparator 13 and is compared with the percentage of $CO+CO_2$ supplied from the above described gas analysis meter 10 and the position of the gas flow volume controlling valve 4 is adjusted to correspond to the difference between them by a valve adjuster 12.

Thus, the present invention adjusts the volume of air drawn in for controlling the percentage of $CO+CO_2$ in the exhaust gas so that various troubles are overcome.

An example of method of the present invention shall be described in the following.

The blowing conditions were as follows: The amount of material treated was 139 tons of molten pig iron, 29.2 tons of scrap iron and 16.9 tons of formed pig iron, the volume of flow of oxygen was 30,800 $Nm.^3$/hour, the composition of the molten pig iron was 4.36% C, 0.77% Si, 0.77% Mn, 0.145% P and 0.031% S and the blowing time was 17.0 minutes.

Oxygen was blown under the above mentioned conditions. From the past experiences, the variation of the percentage of $CO+CO_2$ in the exhaust gas was determined in advance to be as shown by the broken line in FIG. 5 and this value with the lapse of time was set in the device 11 for setting $CO+CO_2$ gas content. As a result, as shown by the solid line in FIG. 5, a blowing process coinciding very closely with this set value was obtained.

Figure 5:
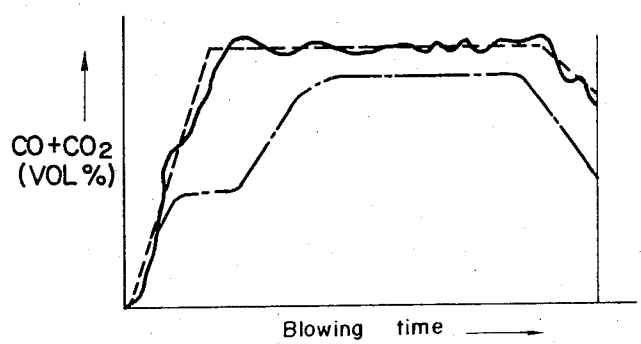
FIG. 5 is a graph showing the variations of the percentage of $CO+CO_2$ with the lapse of time while carrying out the present invention and in a conventional method.

The variation with the lapse of time shown by the one-dot chain line in FIG. 5 is according to a conventional converter pressure control.

As evident from these lines, when the recovery limit of the valuable gas was made 65.0% CO, the gas recovering time was 8.0 minutes in the conventional control but was 15.0 minutes in the present invention and the CO concentration was 70.0% in the conventional control but was as high as to be 90.0% in the present invention. Thus, a gas of a very high concentration was obtained in the present invention.

Further, the total volume of the exhaust gas during the entire blowing period was 13,000 $Nm.^3$/hour as compared with 21,500 $Nm.^3$/hour in the conventional control. Thus, it was found that the volumes of the treated gas and incoming air had been reduced. This means that the equipment can be made smaller. Further, what is very important is that, in case such exhaust gas information is to be used to judge or control the steel bath carbon value, the percentage of $CO+CO_2$ in the exhaust gas will be of the predetermined value and therefore the decarburizing velocity can be calculated simply, quickly and accurately simply by measuring the gas flow volume of a very small lag time under the application of this set value as it is, when the said decarburizing velocity is to be determined.

That is to say, with a conventional converter control, as described above, the percentage of $CO+CO_2$ must in practice be measured at every moment and thus, a great lag in time of analysis occurs and no correct value can be obtained.

Figure 6:
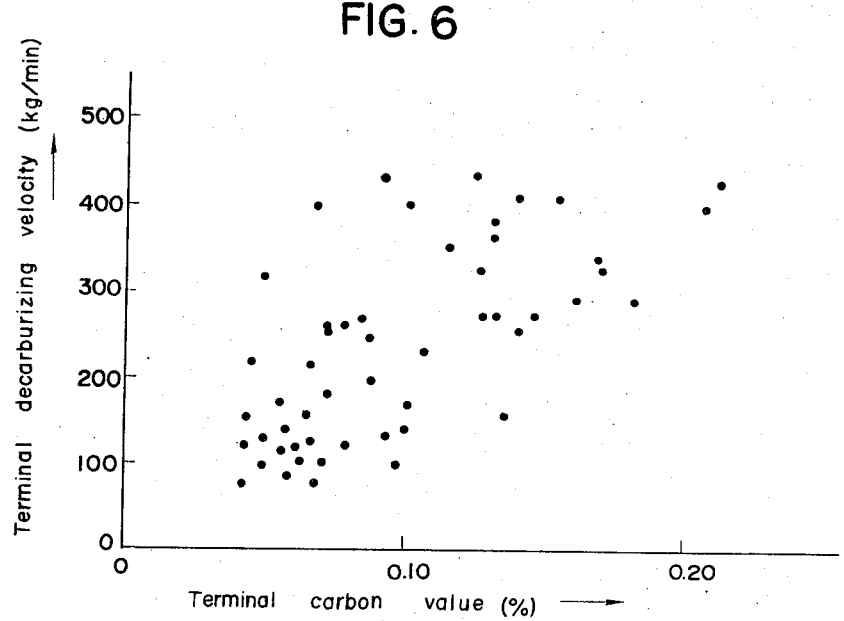
FIG. 6 is a graph showing relationships between the decarburizing velocity in kg./min. and the terminal carbon value in percent in the molten steel by the conventional method.

For example, FIG. 6 shows relationship between the terminal carbon value in percent and the decarburizing velocity in kg./min. of a molten steel when calculating the decarburizing velocity by measuring the percentage of $CO+CO_2$ in the gas and the gas flow volume after a great lag time according to the conventional method. They have a great fluctuation and are very low in correlativity.

Figure 7:
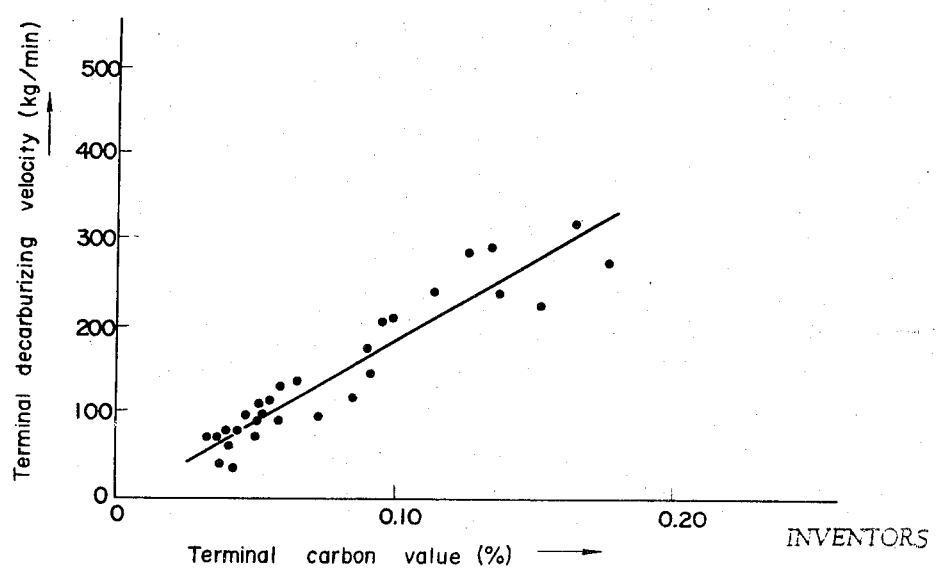
FIG. 7 is a view showing relationships between the decarburizing velocity in kg./min. and the terminal carbon value in percent in the molten steel according to the method of the present invention.

FIG. 7 shows relationship between the terminal carbon value in percent and the decarburizing velocity in kg./min. of the molten steel when the gas information according to the present invention was used. A very high correlation can be found between them.

As described above, in the present invention, a gas discharged out of an oxygen top-blowing converter can be controlled very ideally and the effect obtained thereby is very important.

Further, not only is the present invention effective also in the case of dissipating such exhaust gas into the atmosphere through the exhaust gas conduit pipe without recovering it but also it is not deviating from the scope of the present invention to adopt the present invention particularly only in the end period of the blowing.

What is claimed is:

1. A method of operating an oxygen top blowing converter having an apparatus for recovering converter exhaust gas which includes a gas flow volume control means in an exhaust gas conduit, wherein molten iron is refined by continuously blowing a certain amount of oxygen into the molten iron in the converter through a lance and the carbon content of the molten steel in the converter is judged from exhaust gas information from the apparatus for recovering converter exhaust gas, which apparatus draws the exhaust gas discharged from the converter mouth into the apparatus by means of a suction blower provided in the exhaust gas conduit in the apparatus, and the exhaust gas is recovered, comprising carrying out, at least during the final period of blowing, the steps of analyzing the exhaust gas for CO and $CO_2$, regulating the gas flow volume control device provided in the exhaust gas conduit so that the composition of the exhaust gas, with respect to CO and $CO_2$ flowing through said exhaust gas conduit, including air drawn into the conduit through the space between the converter mouth and the start of the conduit coincides with the desired pattern of the variation of the composition, with respect to CO and $CO_2$, previously obtained from the results of various heats carried out in the past under the same blowing conditions as those in the present heat for regulating the drawing-in of air into the exhaust gas caused by a changed positional relationship of the converter mouth and the start of the conduit due to the presence of slag and the like which are different from the positional relationship in previous heats for reproducing the exhaust gas conditions of previous heats suitable for judging the carbon content of the molten steel in the converter, then detecting the decarburizing velocity from the CO and $CO_2$ analysis at each moment in the final period of blowing, during which the volume of exhaust gas flowing through said exhaust gas conduit decreases sharply, and judging the carbon content of the molten steel by comparing the detected value of the decarburizing velocity in the final blowing period of the heat with a graphically representable correlative relation between the decarburizing velocity and the carbon content of molten steels during the final period of blowing obtained from previous heats carried out under the same blowing conditions.

References Cited

UNITED STATES PATENTS

| | | | |
|---|---|---|---|
| 3,118,759 | 1/1964 | Okaniwa et al. | 75—60 |
| 3,154,406 | 10/1964 | Allard | 75—60 |
| 3,181,343 | 5/1965 | Dumont-Fillon | 73—23 |
| 3,218,158 | 11/1965 | Dumont-Fillon | 75—60 |
| 3,321,302 | 5/1967 | Rieder | 75—60 |
| 3,329,495 | 7/1967 | Ohta et al. | 75—60 |
| 3,489,518 | 1/1970 | Revell et al. | 75—60 X |
| 3,494,763 | 2/1970 | Kato et al. | 75—60 |

FOREIGN PATENTS

| | | | |
|---|---|---|---|
| 667,483 | 1/1966 | Belgium | 75—60 |
| 294,565 | 1/1967 | Australia | 75—60 |

L. DEWAYNE RUTLEDGE, Primary Examiner

G. K. WHITE, Assistant Examiner